(12) United States Patent
Fletcher

(10) Patent No.: US 12,170,671 B2
(45) Date of Patent: *Dec. 17, 2024

(54) SYSTEMS AND METHODS FOR SECURE SELECTION OF A USER PROFILE IN A SHARED CONTEXT

(71) Applicant: Verizon Patent and Licensing Inc., Basking Ridge, NJ (US)

(72) Inventor: George Fletcher, Round Hill, VA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 264 days.

This patent is subject to a terminal disclaimer.

(21) Appl. No.: 17/930,750

(22) Filed: Sep. 9, 2022

(65) Prior Publication Data

US 2023/0007008 A1   Jan. 5, 2023

Related U.S. Application Data

(63) Continuation of application No. 16/743,730, filed on Jan. 15, 2020, now Pat. No. 11,444,949.

(51) Int. Cl.
*H04L 9/40* (2022.01)

(52) U.S. Cl.
CPC ........ *H04L 63/102* (2013.01); *H04L 63/0492* (2013.01); *H04L 63/0861* (2013.01); *H04L 63/20* (2013.01)

(58) Field of Classification Search
USPC ........................................................ 726/28
See application file for complete search history.

(56) References Cited

U.S. PATENT DOCUMENTS

| | | | | |
|---|---|---|---|---|
| 7,350,237 | B2* | 3/2008 | Vogel .................. | G06F 21/6227 726/28 |
| 9,065,872 | B1* | 6/2015 | Duarte .................. | H04L 67/535 |
| 9,344,436 | B1* | 5/2016 | Sheng ................... | H04W 12/08 |
| 10,771,458 | B1* | 9/2020 | Xia ....................... | H04W 12/64 |
| 10,835,826 | B1* | 11/2020 | Temlyakov ........... | A63F 13/798 |
| 10,885,091 | B1* | 1/2021 | Meng ................. | G06F 16/24578 |
| 11,025,602 | B1* | 6/2021 | Machani ............. | H04L 63/0281 |
| 11,115,649 | B1* | 9/2021 | Matsuda ............... | H04N 13/344 |
| 2008/0100414 | A1* | 5/2008 | Diab .................... | H04L 63/0861 340/5.1 |
| 2008/0189776 | A1* | 8/2008 | Constable ........... | H04W 12/065 726/7 |

(Continued)

*Primary Examiner* — Kambiz Zand
*Assistant Examiner* — Mahabub S Ahmed

(57) ABSTRACT

Disclosed are systems and methods for secure selection of a user profile in a shared context. For example, a method may include: determining, by one or more processors, an association between a user device and a shared user profile; determining, by the one or more processors, that the user device is within a predetermined proximity of a multiuser device; determining, by the one or more processors, the shared user profile associated with the user device as a result of determining that the user device is within the predetermined proximity of the multiuser device; receiving, by the one or more processors, biometric verification from the first user; and activating, by the one or more processors, the first specific user profile associated with the first user on the multiuser device as a result of determining that the first user has successfully provided biometric verification.

20 Claims, 4 Drawing Sheets

(56) References Cited

U.S. PATENT DOCUMENTS

| | | | |
|---|---|---|---|
| 2010/0205236 A1* | 8/2010 | Ochiai | H04L 67/306 |
| | | | 709/202 |
| 2014/0075492 A1* | 3/2014 | Kapadia | G06F 21/604 |
| | | | 726/1 |
| 2014/0141750 A1* | 5/2014 | Lazaridis | H04L 63/126 |
| | | | 455/411 |
| 2015/0209676 A1* | 7/2015 | Tsuchiya | A63F 13/71 |
| | | | 463/29 |
| 2015/0350908 A1* | 12/2015 | Daniels | G06F 21/35 |
| | | | 455/411 |
| 2016/0004845 A1* | 1/2016 | Choudhury | H04W 12/08 |
| | | | 726/28 |
| 2016/0127900 A1* | 5/2016 | John Archibald | G06F 21/32 |
| | | | 726/7 |
| 2016/0292404 A1* | 10/2016 | Tseng | G06F 21/31 |
| 2016/0379220 A1* | 12/2016 | Tunnell | H04W 12/068 |
| | | | 705/71 |
| 2017/0251268 A1* | 8/2017 | Zhao | G06F 3/017 |
| 2017/0257670 A1* | 9/2017 | Hardt | H04N 21/812 |
| 2017/0286656 A1* | 10/2017 | Kohli | H04L 63/0428 |
| 2018/0063263 A1* | 3/2018 | Bandela | H04N 21/44224 |
| 2020/0015321 A1* | 1/2020 | Hayashi | G06F 16/00 |
| 2020/0050796 A1* | 2/2020 | Lacey | G06Q 30/0251 |
| 2020/0194004 A1* | 6/2020 | Bates | G10L 17/00 |
| 2020/0329035 A1* | 10/2020 | Gorgenyi | H04L 63/0861 |
| 2021/0065719 A1* | 3/2021 | Wang | G06F 16/783 |
| 2021/0090578 A1* | 3/2021 | Trapp | G06F 21/32 |
| 2021/0266738 A1* | 8/2021 | Akhoury | H04W 12/08 |
| 2021/0327168 A1* | 10/2021 | Mendes | G06Q 10/02 |
| 2023/0224373 A1* | 7/2023 | Rao | H04L 67/306 |
| | | | 709/228 |

\* cited by examiner

SYSTEMS AND METHODS FOR SECURE SELECTION OF A USER PROFILE IN A SHARED CONTEXT

CROSS-REFERENCE TO RELATED APPLICATION(S)

This application is a continuation of and claims the benefit of priority to U.S. application Ser. No. 16/743,730, filed Jan. 15, 2020, the entirety of which is incorporated by reference herein.

TECHNICAL FIELD

The present disclosure relates to systems and methods for secure selection of a user profile in a shared context.

BACKGROUND

A shared device, such as a TV, washing machine, automobile, etc., may be available to more than one users in any given setting. Accordingly, user profiles associated with such shared devices may be utilized to provide the appropriate content and/or setting for a user accessing the shared device. Conventional methods of user profile selection and activation for shared devices, however, do not require identification and/or authentication. There remains a need for an enhanced method of identification and authentication for access to user profiles associated with such shared devices.

SUMMARY OF THE DISCLOSURE

Embodiments of the present disclosure include systems and methods for secure selection of a user profile in a shared context.

According to certain embodiments, a computer-implemented method is disclosed. The computer-implemented method may include: determining, by one or more processors, an association between a user device and a shared user profile, wherein the shared user profile is associated with a first user and a second user, and wherein the shared user profile includes a first specific user profile associated with the first user and a second specific user profile associated with the second user, the first specific user profile including settings specific to the first user and the second specific user profile including settings specific to the second user; determining, by the one or more processors, that the user device is within a predetermined proximity of a multiuser device; determining, by the one or more processors, the shared user profile associated with the user device as a result of determining that the user device is within the predetermined proximity of the multiuser device; receiving, by the one or more processors, biometric verification from the first user; and activating, by the one or more processors, the first specific user profile associated with the first user on the multiuser device as a result of determining that the first user has successfully provided biometric verification.

In accordance with another embodiment, a computer system is disclosed. The computer system may include: a data storage device (e.g., at least one memory) storing processor-readable instructions; and at least one processor configured to execute the instructions to perform a method. The method may include determining an association between a user device and a shared user profile, wherein the shared user profile is associated with a first user and a second user, and wherein the shared user profile includes a first specific user profile associated with the first user and a second specific user profile associated with the second user, the first specific user profile including settings specific to the first user and the second specific user profile including settings specific to the second user; determining that the user device is within a predetermined proximity of a multiuser device; determining the shared user profile associated with the user device as a result of determining that the user device is within the predetermined proximity of the multiuser device; receiving biometric verification from the first user; and activating the first specific user profile associated with the first user on the multiuser device as a result of determining that the first user has successfully provided biometric verification.

In accordance with another embodiment, a non-transitory computer-readable medium is disclosed. The non-transitory computer-readable medium may contain instructions that, when executed by a processor, cause the processor to perform a method including: determining an association between a user device and a shared user profile, wherein the shared user profile is associated with a first user and a second user, and wherein the shared user profile includes a first specific user profile associated with the first user and a second specific user profile associated with the second user, the first specific user profile including settings specific to the first user and the second specific user profile including settings specific to the second user; determining that the user device is within a predetermined proximity of a multiuser device; determining the shared user profile associated with the user device as a result of determining that the user device is within the predetermined proximity of the multiuser device; receiving biometric verification from the first user; and activating the first specific user profile associated with the first user on the multiuser device as a result of determining that the first user has successfully provided biometric verification.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

As noted above, conventional methods of user profile selection and activation for shared devices, however, do not require identification and/or authentication. For example, a user may change the settings in an automobile based merely on a Bluetooth connection between the user's smartphone and the automobile. That is, the automobile's settings may be changed without any identification and/or authentication. Accordingly, there remains a need for an enhanced method of identification and authentication for access to user profiles associated with such shared devices. For example, the embodiments disclosed herein may allow a user to select a user profile (e.g., a user profile associated with an online streaming service) associated with a shared device (e.g., a shared TV) based on an authentication process (e.g., facial recognition, fingerprint, behavioral biometric, voice authentication, etc.) on the shared device and/or a user device (e.g., a smartphone).

Figure 1:
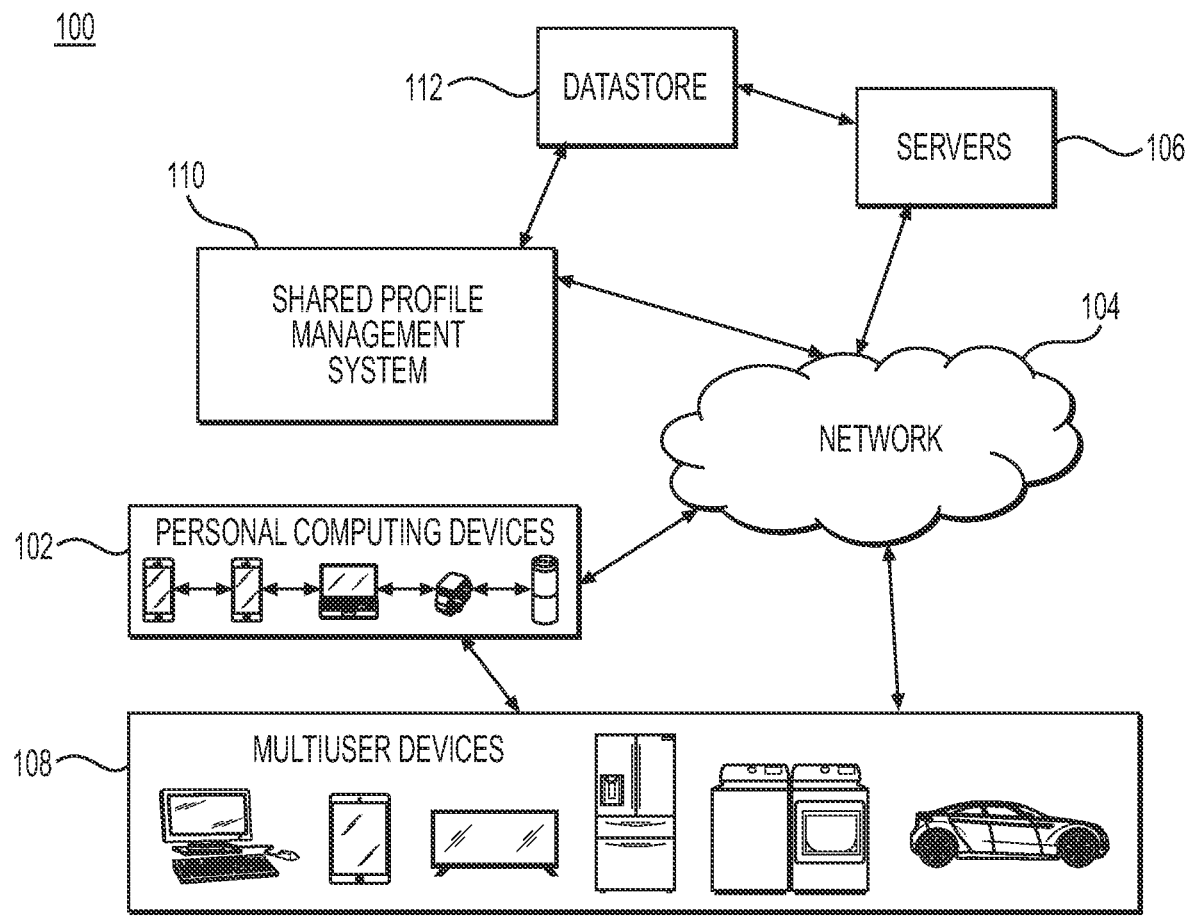
FIG. 1 depicts a schematic diagram illustrating an example of a computer network and environment within which the computer systems and methods disclosed herein are implemented according to some embodiments of the present disclosure.

FIG. 1 shows a block diagram of an exemplary electronic communications system 100 for implementing embodiments of the present disclosure, or aspects thereof. System 100 may include one or more personal computing devices 102. Personal computing devices 102 may be implemented with devices, and/or applications running thereon. By way of example, personal computing devices 102 may include personal computers, laptops, tablet computers, personal digital assistants, mobile telephones, smartphones, pagers, smartwatches, and/or other types of electronic communication devices. In the context of the current disclosure, personal computing devices 102 may be referred to as a user using one or more of the aforementioned devices and/or applications. Personal computing devices 102 may be configured to communicate to and/or through network 104.

System 100 may include one or more multiuser devices 108. Multiuser devices 108 may be implemented with devices, and/or applications running thereon. By way of example, multiuser devices 108 may include computers, tablet computers, televisions, washing and drying machines, refrigerators, automobiles, and/or other types of electronic communication devices. Multiuser devices 108 may be configured to communicate to and/or through network 104. In the context of the current disclosure, multiuser devices 108 may be referred to as a user using one or more of the aforementioned devices and/or applications. Multiuser devices 108 may be configured to communicate to and/or through network 104.

In certain embodiments, network 104 may include any combination of communications networks. For example, network 104 may include the Internet and/or another type of wide area network, an intranet, a metropolitan area network, a local area network, a wireless network, a cellular communications network, etc. In some embodiments, personal computing devices 102 may communicate with one or more multiuser devices 108 through network 104. In other embodiments, personal computing devices 102 may communicate with one or more multiuser devices 108 through a local area network or direct connection, such as, via a Bluetooth connection.

Servers 106 may include one or more servers configured to interact with the network 104, one or more data stores 112, and/or a shared profile management system 110. In addition, consistent with some embodiments, servers 106 may be implemented as a single server, a server system comprising a plurality of servers, or a server farm comprising a load balancing system and a plurality of servers. Servers 106 may be hardware, software, and/or a combination thereof. In some embodiments, a product and/or service may be provided to the personal computing devices 102 and/or the multiuser devices 108 via the servers 106. For example, the servers 106 may be web, on-line streaming service, and/or e-mail servers.

While the current disclosure describes the shared profile management system 110 as a separate component from the servers 106 and data stores 112, it is understood that the servers 106 may comprise the shared profile management system 110 in alternative embodiments. In some embodiments, the shared profile management system 110 may be included in the one or more personal computing devices 102, the one or more multiuser devices 108 and/or the servers 106.

In certain embodiments, the shared profile management system 110 and/or the servers 106 may also be configured to interact with a data store 112. The data store 112 may include one or more logically and/or physically separate databases configured to store data. The data stored in data store 112 may be received from servers 106, from the shared profile management system 110, and/or from any entity on the network 104. The data stored in the data store 112 may take various forms including, but not limited to, account names, e-mails, instant messages, chat messages, text messages, SMS messages, pager communications, blog posts, news items, addresses, account names or other identifiers, and other electronic communications, user-generated content, search histories, account data, preference data, and/or any combination thereof. In some embodiments, the data stored in the data store 112 may include one or more user profiles and associated identification information, as will be described in further detail below.

In some embodiments, the shared profile management system 110 and/or the data store 112 may be implemented using a single computer, server, and/or network element. The shared profile management system 110 and/or the data store 112 may also be implemented on one or more servers 106. In other embodiments, the data store 112 and/or data stored on the shared profile management system 110 may be maintained in a network attached storage device, in a storage area network, or combinations thereof, etc. Furthermore, data stored on the shared profile management system 110 and/or the data store 112 may be maintained and/or queried using numerous types of database software and programming languages, such as SQL, MySQL, IBM DB2®, Microsoft Access®, PERL, C/C++, Java®, etc.

Although the above description describes personal computing devices, multiuser devices and servers separately, personal computing devices and/or multiuser devices may perform the role of servers and vice versa. Additionally, personal computing devices 102 and/or multiuser devices 108 may have the same hardware components as servers 106. Furthermore, the embodiments of this disclosure may also be implemented on the same device serving both as a client and a server.

The present disclosure discloses embodiments directed to using authentication to select a desired profile and/or persona of a shared multiuser device. In some embodiments, the authentication may comprise biometric authentication integrated into the shared multiuser device itself (e.g., a fingerprint reader on a washing machine) or on an external device (e.g., a smart phone wirelessly connected to the washing machine).

Figure 2:
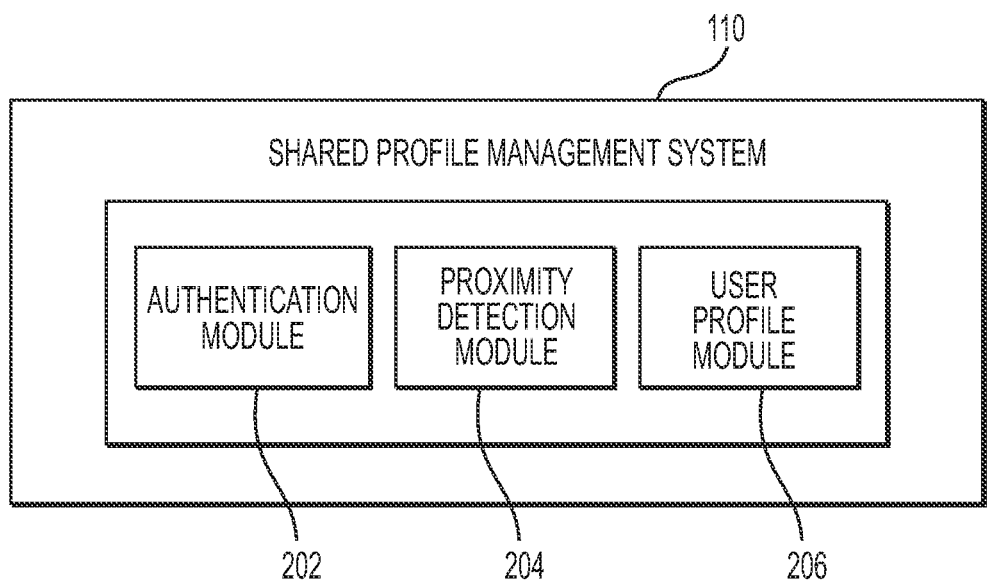
FIG. 2 depicts a shared profile management system according to some embodiments.

FIG. 2 depicts an exemplary embodiment of the shared profile management system 110. As shown in FIG. 2, the shared profile management system 110 may comprise an authentication module 202, a proximity detection module 204, and a user profile module 206 according to some embodiments. In some embodiments, some of the one or more modules may be combined to form fewer modules, models, or engines. In some embodiments, some of the one or more modules may be separated into separate, more numerous modules, models, or engines. In some embodiments, some of the one or more modules may be removed while others may be added.

The proximity detection module 204 may be configured to detect a user coming within a predetermined proximity to a multiuser device 108 according to some embodiments. For example, the proximity detection module 204 may detect when a personal computing device 102 moves into a proximity detection range of the multiuser device 108. In some embodiments, the proximity detection module 204 may be configured to analyze a signal (e.g., a radio frequency (RF) signal) transmitted by the personal computing device 102 and received by the multiuser device 108. The proximity detection module 204 may process the received signal and determine the signal strength to determine proximity and/or location of the personal computing device 102 relative to the multiuser device 108. Based on a determination that the personal computing device 102 is within the proximity detection range of the multiuser device 108, the multiuser device 108 may analyze the signature (e.g., RF signature) of the personal computing device 102 to determine the wireless communications protocol(s) used by that personal computing device 102. If there is compatibility with the multiuser device 108, the multiuser device 108 may establish a communications link with the personal computing device 102. In some embodiments, the proximity detection module 204 may determine that the personal computing device 102 is within the proximity detection range of the multiuser device 108 by detecting that the personal computing device 102 has established a communication link with a local network to which the multiuser device 108 is connected to. In some embodiments, the personal computing device 102 may be associated with one or more user profiles managed by the user profile module 206, as will be described in further detail below. In some embodiments, the proximity detection module 204 may determine that the personal computing device 102 is within the predetermined proximity detection range by detecting a message (e.g., text message, SMS message, etc.) transmitted by the personal computing device 102 and received by the multiuser device 108.

The user profile module 206 may be configured to manage one or more user profiles associated with the multiuser device 108. In some embodiments, the user profile module 206 may receive, retrieve, and/or store user profiles associated with the multiuser device 108. For example, in instances in which the multiuser device 108 is a washing machine, one or more user profiles associated with the washing machine may include one or more preferred settings for the washing machine. As another example, in instances in which the multiuser device 108 is a television with an application that provides an online streaming service, one or more user profiles associated with the application may include one or more preferred settings (e.g., recommended movies and shows, previously watches movies and shows, etc.) for the application. The one or more user profiles managed by the user profile module 206 may be stored in a data store of the shared profile management system 110 and/or the data store 112.

A user may attempt to access a multiuser device 108. In some embodiments, the user may attempt to directly access the multiuser device 108. In other embodiments, the user may attempt to access the multiuser device 108 via the personal computing device 102. For example, the personal computing device 102 may be brought within a predetermined proximity detection range of the multiuser device 108. This may trigger the user profile module 206 to retrieve one or more user profiles associated with the multiuser device 108. In some embodiments, the user profile module 206 may retrieve one or more user profiles associated with the detected personal computing device 102. In some embodiments, one primary shared user profile may be associated with the multiuser device 108. In such embodiments, the primary shared profile may include one or more specific user profiles. For example, the primary shared user profile may be a profile for a family sharing the multiuser device 108 and the one or more specific user profiles may be the user profiles for each family member. In some embodiments, the user profile module 206 may display the primary shared user profile including the one or more specific user profiles as a result of detecting that a user is attempting to access the multiuser device 108, and the user may attempt to activate a specific user profile.

A user may be required to perform an authentication process in order to activate one of the retrieved one or more user profiles associated with the multiuser device 108, as will be described in further detail below. For example, the user may be required to perform an authentication process to activate a specific user profile as described above. In some embodiments, the user profile module 206 may additionally and/or alternatively be configured to prompt the user to generate a new user profile. In such embodiments, the user may provide biometric information for authentication as will be described in further detail below. The generated new user profile module along with the provided biometric information may be stored in the data store of the shared profile management system 110 and/or the data store 112.

In some embodiments, the user profile module 206 may bind a specific user profile to a personal computing device 102. For example, a user may attempt to activate a specific user profile as described above. Specifically, the specific user profile may be one of a plurality of specific user profiles associated with the personal computing device 102 and displayed to the user based on, for example, a detection that the personal computing device 102 is within a predetermined proximity detection range of a multiuser device 108. Based on a determination that the user has successfully performed an authentication process to activate the specific user profile, the user profile module 206 may bind the activated specific user profile to the personal computing device 102 (hereinafter referred to as a personal computing device and specific user profile pairing). The personal computing device and specific user profile pairing may be stored in the data store of the shared profile management system and/or the data store 112. In some embodiments, a user using the bound personal computing device may now longer be required to come within the predetermined proximity detection range of the multiuser device 108 to activate the bound specific user profile on the multiuser device 108. For example, the user may perform an authentication process to activate the bound specific user profile on the multiuser device 108 even when the bound personal computing device is not brought within the predetermined proximity detection range of the multiuser device 108. In some embodiments, the specific user profile may be bound to the personal computing device 102 (e.g., to form a personal computing device and specific user profile pairing) simply based on the detection that the personal computing device 102 is within the predetermined range of the multiuser device 108. In such embodiments, the user may subsequently perform one or more authentication processes to activate the specific user profile on the multiuser device 108 as disclosed herein.

The authentication module 202 may be configured to perform one or more authentication processes for a user attempting to activate a user profile associated with the multiuser device 108 according to some embodiments. In some embodiments, the one or more authentication processes may include biometric authentication performed through voice recognition, fingerprint sensing, facial recognition, and/or iris scanning, among others. In some embodiments, the authentication process may be performed via one or more biometrics reading device on the multiuser device 108 and/or the personal computing device 102. The authentication processes may additionally, or alternatively, include a motion detection on the multiuser device 108 and/or the personal computing device 102. For example, a motion pattern such as a predetermined swipe motion may be detected by the multiuser device 108 and/or the personal computing device 102 for the authentication process. The identification information, e.g., the predetermined biometric information and/or the predetermined motion pattern associated with a user profile, may be received, retrieved, and/or stored by the authentication module 202. In some embodiments, the identification information may be stored in the data store of the shared profile management system 110 and/or the data store 112.

In some embodiments, the authentication module 202 may be configured to notify the user profile module 206 that the user has successfully performed an authentication process associated with a particular user profile. In such embodiments, the user profile module 206 may activate the user profile associated with the user with reference to the multiuser device 108. In some embodiments, the authentication module 202 may be configured to notify the user profile module 206 that the user has failed to perform an authentication process associated with a particular user profile. In such embodiments, the user profile module 206 may block the user from access to any of the user profiles associated with the multiuser device 108. In some embodiments, the user profile module 206 may activate a guest profile to the user based on a notification that the user has failed to perform the authentication process. As noted above, a user may be prompted to generate a new user profile by the user profile module 206. In such instances, the authentication module 202 may be configured to receive and store identification information associated with the new user profile. For example, the authentication module 202 may receive and store biometrics information and/or motion pattern information from the user associated with the new user profile.

In some instances, the embodiments disclosed herein may be applied to an on-line streaming service. For example, the multiuser device 108 may be a television. The online streaming service may maintain one or more user profiles associated with a shared primary profile on the online streaming service. The shared primary profile may be a profile for a family and the one or more user profiles may be profiles for each family member (e.g., indicating each family member's movie and/or show preference). Each user profile may be associated with a family member's personal computing device 102 (e.g., a smart phone). The television, e.g., the multiuser device 108, may detect that a family member's personal computing device 102 is within a predetermined detection range. Upon detection of the personal computing device 102, the television may establish a connection with the personal computing device 102 and display the associated user profile on the television and/or the personal computing device 102. In some embodiments, the television may additionally display the other user profiles associated with the shared primary profile. The user may provide biometrics identification information to activate his or her dedicated user profile. For example, the user may provide a fingerprint, a facial scan, and/or a motion pattern on the personal computing device 102. In some embodiments, the user may provide the fingerprint, the facial scan, and/or the motion pattern directly to the television. For example, the user may provide the fingerprint, the facial scan, and/or the motion pattern via a remote control of the television.

In some instances, the embodiments disclosed herein may be applied to a shared tablet computer. For example, the tablet computer may be the multiuser device 108. The tablet computer may maintain one or more user profiles for each individual who has access to the tablet computer. Each of the one or more user profiles may be stored with biometrics identification information associated with each user. Accordingly, a user may activate a dedicated user profile on the tablet computer by providing biometrics information (e.g., using facial recognition) to the tablet computer.

In some instances, the embodiments disclosed herein may be applied to a shared application on a multiuser device 108. For example, the shared application on the multiuser device 108 may maintain one or more user profiles for each individual who has access to the application. Each of the one or more user profiles may be stored with a biometrics identification information associated with each user. Accordingly, a user may activate a dedicated user profile on the shared application by providing biometrics information (e.g., using facial recognition and/or voice recognition) to the multiuser device 108.

In some instances, the embodiments disclosed herein may be applied to a washing machine. For example, the washing machine 108 may be the multiuser device 108. The washing machine may maintain one or more user profiles for each individual who has access to the washing machine. In some embodiments, the washing machine may include a fingerprint reader such that each user may activate a dedicated user profile on the washing machine by providing a fingerprint to the washing machine. In such instances, each of the user profiles may include one or more preferred washing machine settings. Accordingly, the user may automatically select a preferred washing machine setting by simply providing a fingerprint to the washing machine.

Figure 3:
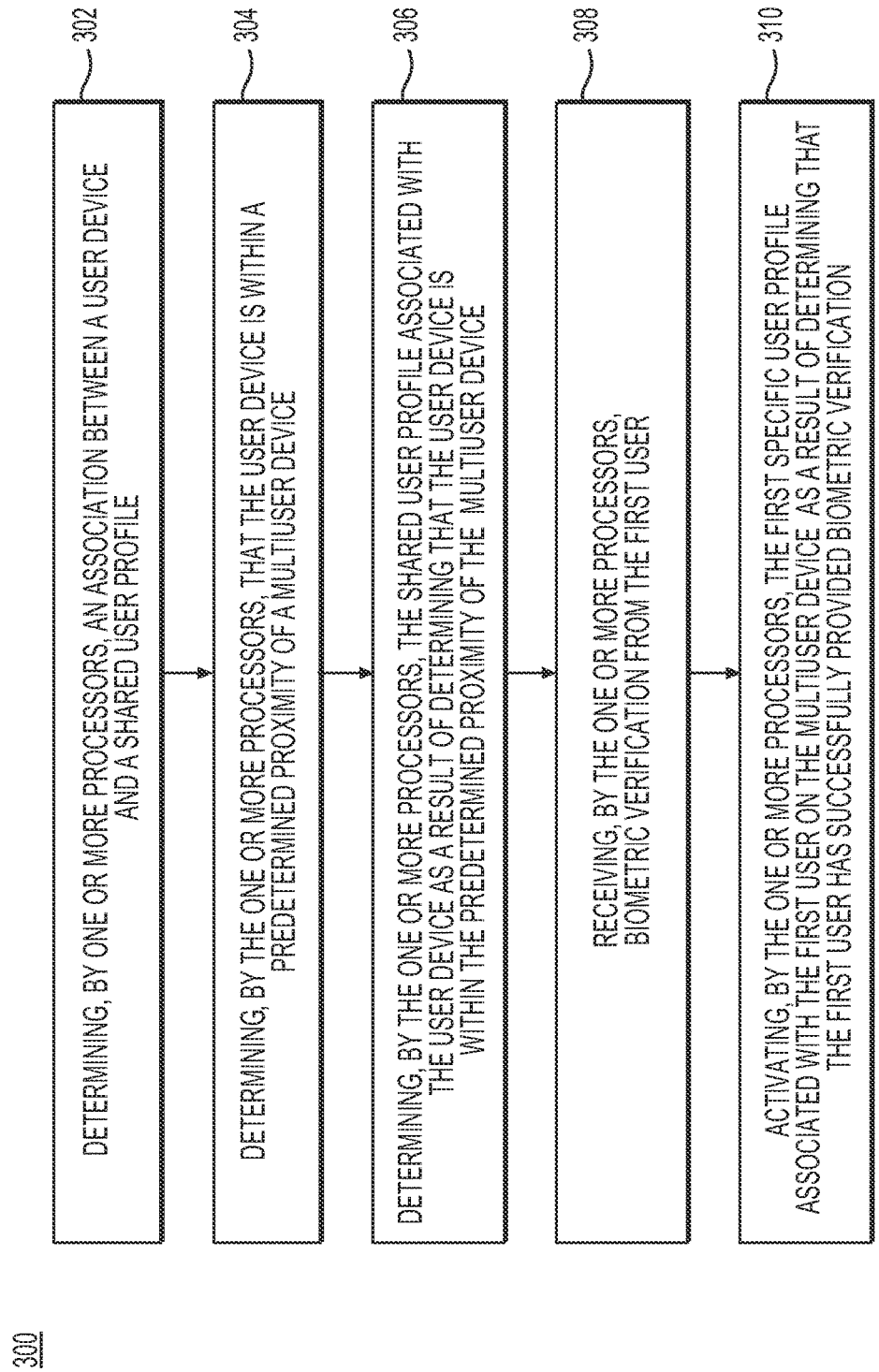
FIG. 3 depicts an exemplary method of secure selection of a profile in a shared context, according to exemplary embodiments of the present disclosure.

FIG. 3 depicts an exemplary method 300 of secure selection of a user profile in a shared context, according to exemplary embodiments of the present disclosure. In step 302, one or more processors may determine an association between a user device and a shared user profile. In some embodiments, the shared user profile may be associated with a first user and a second user. In some embodiments, the shared user profile may include a first specific user profile associated with the first user and a second specific user profile associated with the second user, the first specific user profile may include settings specific to the first user and the second specific user profile may include settings specific to the second user. In step 304, the one or more processors may determine that the user device is within a predetermined proximity of a multiuser device. In step 306, the one or more processors may determine the shared user profile associated with the user device as a result of determining that the user device is within the predetermined proximity of the multiuser device. In step 308, the one or more processors may receive biometric verification from the first user. In step 310, the one or more processors may activate the first specific user profile associated with the first user on the multiuser device as a result of determining that the first user has successfully provided biometric verification.

In some embodiments, determining that the user device is within the predetermined proximity of the multiuser device may include receiving a signal transmitted by the user device and determining that the user device is within the predetermined proximity of the multiuser device based on the received signal. In such embodiments, determining that the user device is within the predetermined proximity of the multiuser device based on the received signal may include determining a strength of the received signal; comparing the determined strength of the received signal to a predetermined threshold; and determining that the user device is within the predetermined proximity if the determined strength of the received signal exceeds the predetermined threshold.

In some embodiments, the shared user profile may provide login access to the multiuser device. In some embodiments, the method 300 may include a further step in which the one or more processors may bind the first specific user profile associated to the first user to the user device as a result of determining that the first user has successfully provided biometric verification. In some embodiments, the shared user profile may further include a guest user profile associated with a general user, wherein the guest user profile may include general settings for the general user. In such embodiments, the method 300 may include a further step in which the one or more processors may activate the guest user profile on the multiuser device as a result of determining that the first user has failed to provide biometric verification.

In some embodiments, the method 300 may include a further step in which the one or more processors may authenticate the first user prior to determining the shared user profile associated with the user device; and display the obtained shared user profile to the authenticated first user.

Figure 4:
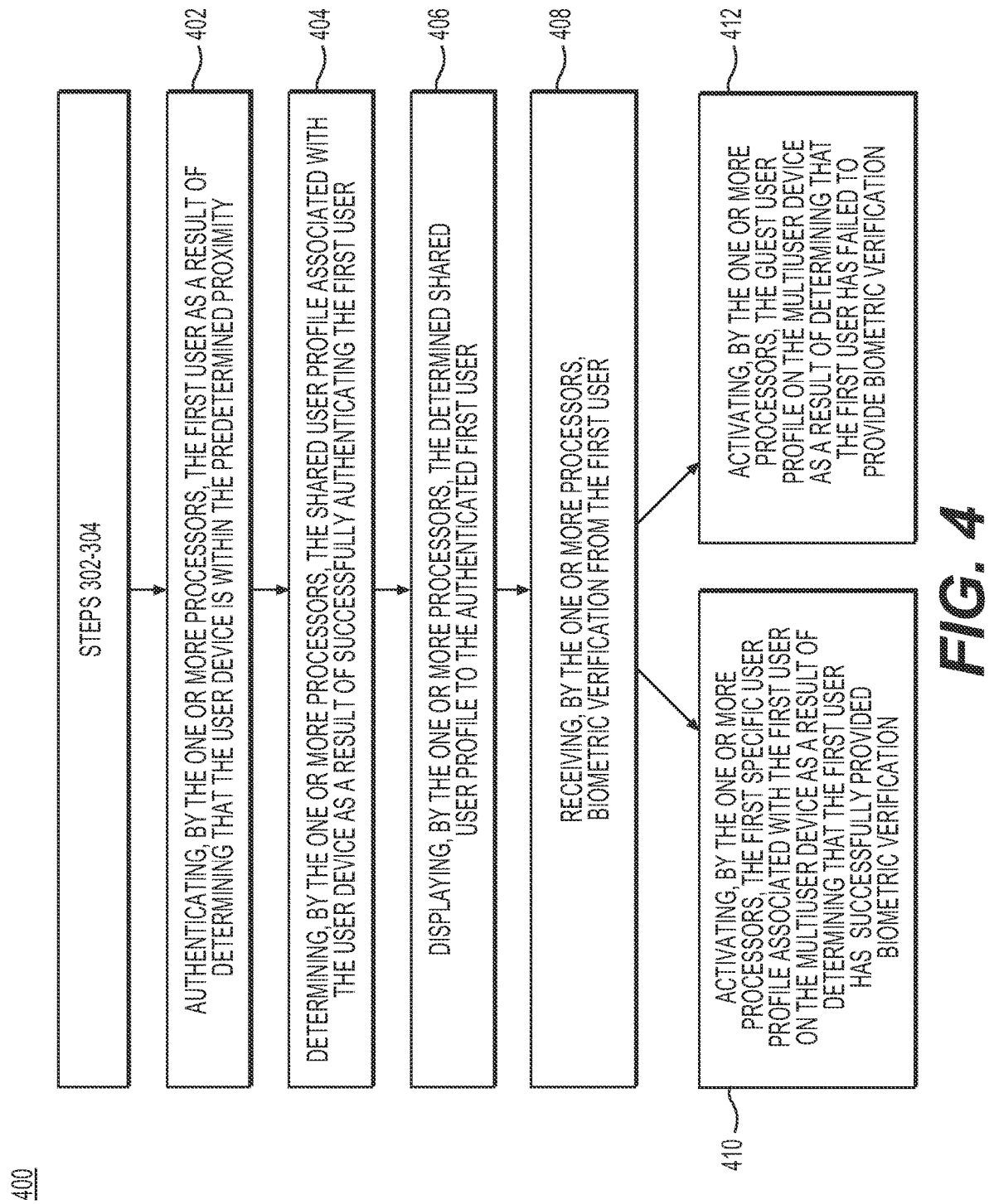
FIG. 4 depicts an exemplary method of secure selection of a profile in a shared context, according to exemplary embodiments of the present disclosure.

FIG. 4 depicts an exemplary method 400 of secure selection of a user profile in a shared context, according to exemplary embodiments of the present disclosure. In some embodiments, method 400 may include steps 302 and 304 as described above with reference to method 300 in FIG. 3. In step 402, the one or more processors may authenticate the first user as a result of determining that the user device is within the predetermined proximity of the multiuser device. In step 404, the one or more processors may determine the shared user profile associated with the user device as a result of successfully authenticating the first user. In step 406, the one or more processors may display the determined shared user profile to the authenticated first user. In step 408, the one or more processors may receive biometric verification from the first user.

As a result of determining that the first user has successfully provided biometric verification, the one or more processors may activate the first specific user profile associated with the first user on the multiuser device in step 410. As a result of determining that the first user has failed to provide biometric verification, the one or more processors may activate the guest user profile on the multiuser device in step 412.

Figure 5:
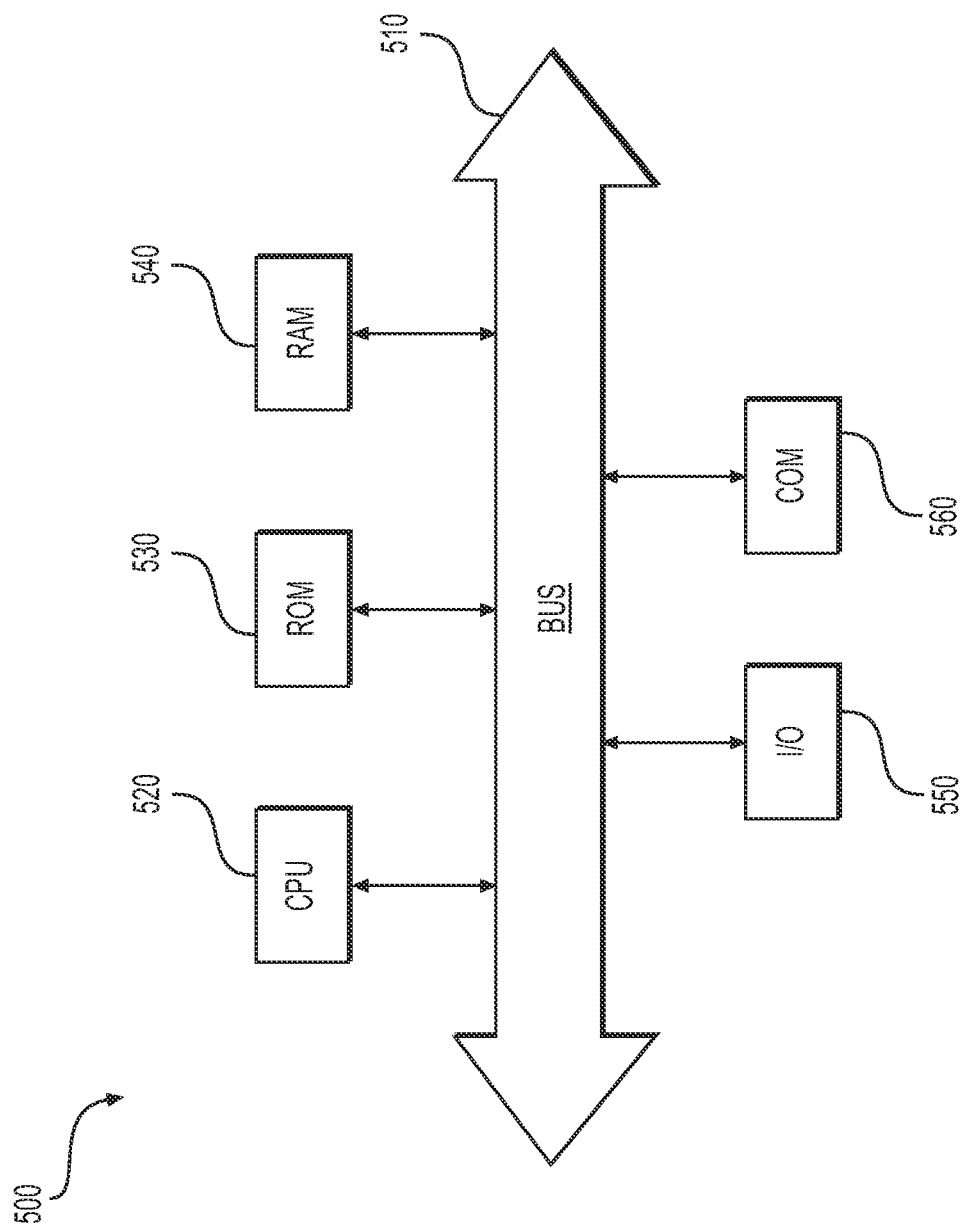
FIG. 5 is a simplified functional block diagram of a computer configured to function according to exemplary embodiments of the present disclosure.

FIG. 5 provides a functional block diagram illustration of general purpose computer hardware platforms. FIG. 5 illustrates a network or host computer platform 500, as may typically be used to implement a server, such as the one or more personal computing devices 102, servers 106, data stores 112, multiuser devices 108, and the shared profile management system 110. It is believed that those skilled in the art are familiar with the structure, programming, and general operation of such computer equipment and as a result the drawings should be self-explanatory.

A platform for a server or the like 500, for example, may include a data communication interface for packet data communication 560. The platform may also include a central processing unit (CPU) 520, in the form of one or more processors, for executing program instructions. The platform typically includes an internal communication bus 510, program storage, and data storage for various data files to be processed and/or communicated by the platform such as ROM 530 and RAM 540, although the computer platform 500 often receives programming and data via network communications 560. The hardware elements, operating systems, and programming languages of such equipment are conventional in nature, and it is presumed that those skilled in the art are adequately familiar therewith. The computer platform 500 also may include input and output ports 550 to connect with input and output devices such as keyboards, mice, touchscreens, monitors, displays, etc. Of course, the various computer platform functions may be implemented in a distributed fashion on a number of similar platforms, to distribute the processing load. Alternatively, the computer platforms may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method comprising:
    determining, by one or more processors, that a first user device of a first user is within a predetermined proximity of a multiuser device, the multiuser device being associated with a shared profile, the shared profile comprising a first user profile associated with the first user and a second user profile associated with a second user;

requesting user verification from the first user as a result of determining that the first user device is within the predetermined proximity of the multiuser device; and activating the first user profile associated with the first user on the multiuser device upon receiving verification from the first user, the first user profile including one or more preferred settings of the first user.

2. The computer-implemented method of claim 1, wherein determining that the user device is within the predetermined proximity of the multiuser device comprises:

receiving a signal transmitted by the user device and determining that the user device is within the predetermined proximity of the multiuser device based on the received signal.

3. The computer-implemented method of claim 2, wherein determining that the user device is within the predetermined proximity of the multiuser device based on the received signal comprises:

determining a strength of the received signal;

comparing the determined strength of the received signal to a predetermined threshold; and determining that the user device is within the predetermined proximity if the determined strength of the received signal exceeds the predetermined threshold.

4. The computer-implemented method of claim 1, wherein the shared user profile provides login access to the multiuser device.

5. The computer-implemented method of claim 1, further comprising:

binding the first user profile associated with the first user to the user device as a result of determining that the first user has successfully provided biometric verification.

6. The computer-implemented method of claim 1, wherein the shared user profile further includes a guest user profile associated with a general user, and wherein the guest user profile includes general settings for the general user, the method further comprising:

activating, by the one or more processors, the guest user profile on the multiuser device as a result of determining that the first user has failed to provide biometric verification.

7. The computer-implemented method of claim 1, further comprising:

authenticating, by the one or more processors, the first user prior to determining the shared user profile associated with the user device; and displaying, by the one or more processors, the determined shared user profile to the authenticated first user.

8. A computer system comprising:

at least one memory having processor-readable instructions stored therein; and at least one processor configured to access the memory and execute the processor-readable instructions, which when executed by the at least one processor configured the at least one processor to perform a method including:

determining, by one or more processors, that a first user device of a first user is within a predetermined proximity of a multiuser device, the multiuser device being associated with a shared profile, the shared profile comprising a first user profile associated with the first user and a second user profile associated with a second user;

requesting user verification from the first user as a result of determining that the first user device is within the predetermined proximity of the multiuser device; and activating the first user profile associated with the first user on the multiuser device upon receiving verification from the first user, the first user profile including one or more preferred settings of the first user.

9. The computer system of claim 8, wherein determining that the user device is within the predetermined proximity of the multiuser device comprises:

receiving a signal transmitted by the user device and determining that the user device is within the predetermined proximity of the multiuser device based on the received signal.

10. The computer system of claim 9, wherein determining that the user device is within the predetermined proximity of the multiuser device based on the received signal comprises:

determining a strength of the received signal;

comparing the determined strength of the received signal to a predetermined threshold; and determining that the user device is within the predetermined proximity if the determined strength of the received signal exceeds the predetermined threshold.

11. The computer system of claim 8, wherein the shared user profile provides login access to the multiuser device.

12. The computer system of claim 8, the method further including:

binding the first user profile associated with the first user to the user device as a result of determining that the first user has successfully provided biometric verification.

13. The computer system of claim 8, wherein the shared user profile further includes a guest user profile associated with a general user, and wherein the guest user profile includes general settings for the general user, the method further including:

activating, by the one or more processors, the guest user profile on the multiuser device as a result of determining that the first user has failed to provide biometric verification.

14. The computer system of claim 8, wherein the method further includes:

authenticating, by the one or more processors, the first user prior to determining the shared user profile associated with the user device; and displaying, by the one or more processors, the determined shared user profile to the authenticated first user.

15. A non-transitory computer-readable medium containing instructions that, when executed by a processor, cause the processor to perform a method comprising:

determining, by one or more processors, that a first user device of a first user is within a predetermined proximity of a multiuser device, the multiuser device being associated with a shared profile, the shared profile comprising a first user profile associated with the first user and a second user profile associated with a second user;

requesting user verification from the first user as a result of determining that the first user device is within the predetermined proximity of the multiuser device; and activating the first user profile associated with the first user on the multiuser device upon receiving verification from the first user, the first user profile including one or more preferred settings of the first user.

16. The non-transitory computer-readable medium of claim 15, wherein determining that the user device is within the predetermined proximity of the multiuser device comprises:

receiving a signal transmitted by the user device;
determining a strength of the received signal;
comparing the determined strength of the received signal to a predetermined threshold; and
determining that the user device is within the predetermined proximity if the determined strength of the received signal exceeds the predetermined threshold.

17. The non-transitory computer-readable medium of claim 15, wherein the shared user profile provides login access to the multiuser device.

18. The non-transitory computer-readable medium of claim 15, wherein the method further comprises:
binding the first user profile associated with the first user to the user device as a result of determining that the first user has successfully provided biometric verification.

19. The non-transitory computer-readable medium of claim 15, wherein the shared user profile further includes a guest user profile associated with a general user, and wherein the guest user profile includes general settings for the general user, the method further comprising:
activating, by the one or more processors, the guest user profile on the multiuser device as a result of determining that the first user has failed to provide biometric verification.

20. The non-transitory computer-readable medium of claim 15, wherein the method further comprises:
authenticating, by the one or more processors, the first user prior to determining the shared user profile associated with the user device; and
displaying, by the one or more processors, the determined shared user profile to the authenticated first user.

* * * * *